United States Patent [19]

Morrison

[11] Patent Number: 4,716,027

[45] Date of Patent: Dec. 29, 1987

[54] METHOD FOR SIMULTANEOUSLY SCRUBBING CEMENT KILN EXHAUST GAS AND PRODUCING USEFUL BY-PRODUCTS THEREFROM

[75] Inventor: Garrett L. Morrison, Unity, Me.

[73] Assignee: Passamaquoddy Tribe, A Sovereign Indian tribe recognized by the Government of The United States of America, Thomaston, Me.

[21] Appl. No.: 904,719

[22] Filed: Sep. 5, 1986

Related U.S. Application Data

[63] Continuation-in-part of Ser. No. 890,991, Jul. 25, 1986, which is a continuation-in-part of Ser. No. 796,075, Nov. 7, 1985, abandoned.

[51] Int. Cl.$^4$ .................. C01B 17/16; C01B 21/00; C01B 17/00
[52] U.S. Cl. ........................... 423/225; 423/208; 423/232; 423/235; 423/242; 423/246; 71/31; 106/103
[58] Field of Search ............... 423/235, 235 D, 234, 423/239 A, 208, 242 A, 242 R, 244 A, 244 R, 225, 246, 232, 430; 106/103; 71/31

[56] References Cited

U.S. PATENT DOCUMENTS

| | | | |
|---|---|---|---|
| 3,929,968 | 12/1975 | Taub | 423/242 |
| 4,263,264 | 4/1981 | Ikeda et al. | 423/239 |
| 4,276,272 | 6/1981 | Schlager et al. | 423/244 |

FOREIGN PATENT DOCUMENTS

| | | | |
|---|---|---|---|
| 52-32001 | 3/1977 | Japan | 423/244 |
| 111845 | 11/1918 | United Kingdom | 423/208 |

*Primary Examiner*—Gregory A. Heller

[57] ABSTRACT

This invention relates to an apparatus and method for simultaneously scrubbing acidic exhaust gases and removing metal salts from alkaline waste dust from a cement plant or the like thereby producing useful products from what would otherwise be wasted. In essence the two wastes are combined in water and the resulting solution and precipitate separated in a tank. The solution is useful both to cool incoming waste gas and as a fertilizer, whilst the precipitate is suitable as kiln feed stock.

11 Claims, 2 Drawing Figures

METHOD FOR SIMULTANEOUSLY SCRUBBING CEMENT KILN EXHAUST GAS AND PRODUCING USEFUL BY-PRODUCTS THEREFROM

BACKGROUND OF THE INVENTION

This application is a continuation-in-part of application Ser. No. 890,991, filed July 25, 1986, entitled METHOD AND APPARATUS FOR EXHAUST GAS STREAM SCRUBBING which, in turn, is a continuation-in-part of application Ser. No. 796,075, filed Nov. 7, 1985, which latter is to be abandoned (hereinafter collectively referred to as "Morrison, G.").

This invention relates to the treatment of kiln dust and exhaust fumes from a cement facility to convert the former into a useful product while removing pollutants from the latter.

Dust collection facilities operating at cement or lime producing kilns remove particulate matter from the kiln exhaust. This particulate matter includes calcium carbonate, calcium oxide, and the oxides and carbonates of other metals, depending on the composition of the feed stock to the kiln. Two elements frequently present in the kiln dust are potassium and sodium. These elements limit or prevent the reuse of the kiln dust as kiln feed stock, since they interfere with the properties of the final product, and the dust is therefore discarded. These dust collection facilities do not remove sufficient gaseous pollutants from the exhaust stream and separate scrubbers must be provided if they are to be prevented from entering the atmosphere.

The use of alkali or alkaline earth materials, as solids or in a slurry or in a solution, for scrubbing (removing sulfur and nitrogen oxides) of exhaust gas has been known for years (see discussion in Morrison, G., supra, hereby incorporated by reference). For example, Mehlmann (1985, Zement-Kalk-Gips Edition B) describes the use of hydrated or pulverized limestone at temperatures up to 1100° C., or of spray drying with hydrated lime; and Ayer (1979, EPA-600/7-79-167b) describes the use of lime to scrub exhaust gas from a heating plant. Limestone may be included in the charge of fluidized bed furnaces for the same purpose. In general the oxides of carbon, sulfur, and nitrogen, present in exhaust gas, when reacted with water, produce acids, including sulfuric, sulfurous, nitric, and carbonic. The presence and amounts of each depend on the oxides present, the availability of oxygen, and the reaction conditions. When these acids are reacted with the oxides, hydroxides, or carbonates of alkali or alkaline earth metals, salts of the components are formed. For example, sulfuric acid will react with the calcium carbonate present in limestone to yield calcium sulfate.

The principal object of the present invention is to provide a method and apparatus to eliminate the dust disposal problem present in cement plants and simultaneously to reduce gaseous and particulate emissions and to be able to do so cost effectively, including the conversion of otherwise waste products into useful products.

BRIEF SUMMARY OF THE INVENTION

This invention provides a process that removes a significant portion of the potassium, sodium and sulfur in kiln dust, so that the dust may be reused as kiln feed; and at the same time uses the kiln dust as a reactant for removing the oxides of sulfur, nitrogen and carbon from the exhaust stream.

More specifically, the process will react cement kiln dust or lime kiln dust with acid, produced from the acidic oxides of sulfur, nitrogen and carbon in exhaust gas, to dissolve some components of the dust and render the remaining undissolved solids reuseable as process feed stock; scrub a portion of the oxides of sulfur, nitrogen and carbon from the exhaust stream and make them available for reaction with kiln dust; produce as a by-product alkali and alkaline earth metal salts composed of the scrubbed exhaust gas sulfur, nitrogen and carbon oxides and materials derived from the kiln dust; and utilize heat in the exhaust stream to reduce the water content of the process stream containing the dissolved alkali and alkaline earth metal salts.

In accordance with the invention, there is provided a method of simultaneously scrubbing an exhaust gas stream having acidic oxides and treating dust having alkali and alkaline earth metal compounds as solids, comprising the steps of: (a) mixing the dust with water to form an alkaline solution and (b) passing the gas stream into the said alkaline solution, whereby the said solution and gas react to form an alkali salt solution and a precipitate of alkaline metal salts with insoluble silicates, aluminates and iron compounds.

Preferred methods include cooling and/or dehumidifying the gas stream prior to passing the same into the alkaline solution; utilizing the alkali salt solution for the purpose of such cooling and/or dehumidifying; utilizing said precipitate together with insoluble silicates, aluminates and iron compounds to add to the feed stock of a cement plant to produce cement; utilizing the heat of the gas to remove water from the alkali salt solution aforesaid; utilizing the dissolved solids contents of the alkali salt solution as a fertilizer; and obtaining the exhaust gas stream and dust from the kiln of a cement plant.

In accordance with one aspect of the invention, there is provided a method of converting dust from a cement kiln containing alkali and alkaline earth metal compounds as solids into a product suitable for adding to the feed stock for said kiln, comprising the steps of (a) dissolving the dust in water to form an alkaline solution, and (b) passing exhaust gas from the kiln into the said solution, whereby the solution and gas react to form an alkali salt solution and a precipitate of alkaline metal salts with insoluble silicates, aluminates and iron compounds suitable for adding to the feed stock for the kiln. Preferably, the gas is cooled and dehumidified prior to being passed into the alkaline solution, utilizing the latter for such purpose, and water is evaporated from the alkali salt solution by heat from the gas.

In accordance with a further aspect of the invention, there is provided a method of simultaneously converting dust from a cement kiln containing alkali and alkaline earth metal compounds as solids into a product suitable for adding to the feed stock for kiln, scrubbing the exhaust gas stream from the kiln and producing alkali solids suitable for use as fertilizer, comprising the steps of (a) dissolving the dust in water to form an alkaline solution, and (b) passing exhaust gas from said kiln into the said solution, whereby said solution and gas react to scrub the latter and at the same time form an alkali salt solution and a precipitate of alkaline metal salts with insoluble silicates, aluminates and iron compounds suitable for adding to the feed stock for said kiln, and, lastly, evaporating water from the alkali salt solution to produce a precipitate suitable for use as fertilizer.

The invention also includes apparatus for simultaneously scrubbing a gas stream containing acidic oxides and treating dust from a cement kiln or the like containing alkali and alkaline earth metal salts, comprising a treatment tank, means for feeding a mixture of water and dust into the latter, means for feeding additional water into the said tank further to dilute the mixture aforesaid, means for passing the gas into the mixture to react therewith and to thereby produce an aqueous solution of its water soluble components to form therewith a slurry of acidic oxides and alkali and alkaline earth metal salts and any remaining insoluble compounds, a precipitation tank, means for conveying the slurry from the treatment tank to the precipitation tank wherein the slurry is separated into solids and liquid, the former dropping toward the base of the tank beneath the latter which remains in the upper part thereof, means for removing the said solids from the base of the precipitation tank and means for removing the said liquid from the upper part of the precipitation tank.

In a presently preferred embodiment, the apparatus further comprises a heat exchanger, means for passing the said gas through the heat exchanger prior to being fed into the treatment tank and means for passing liquid removed from the precipitation tank through the heat exchanger, whereby the incoming gas stream is cooled and the said liquid simultaneously heated to remove the water therefrom.

Still further objects, features and advantages of the invention will be apparent from the following detailed description of a presently preferred embodiment thereof taken in conjunction with the accompanying drawings.

DETAILED DESCRIPTION OF PREFERRED EMBODIMENT

The invention comprises method and means for supplying alkaline solids, the kiln dust, water, exhaust gas, and the method and apparatus for first combining the same and then separating the resulting components.

Briefly, the acidic gas and alkaline solids are mixed with water in a treatment tank and react to form a slurry. A settling tank is provided for the separation of undissolved solids from the solution of water and dissolved solids in the slurry. A heat exchanger-crystallization unit is also provided and utilizes the heat, including latent heat, in the exhaust stream to evaporate water from the solution of dissolved salts in the slurry to provide cooling of the exhaust gas for use in the above process. Heat for evaporation of water from the solution of dissolved salts is also obtained from the hot waste dust, the hydration reaction between dust and water, and energy obtained from compression of the exhaust gas.

Figure 1:
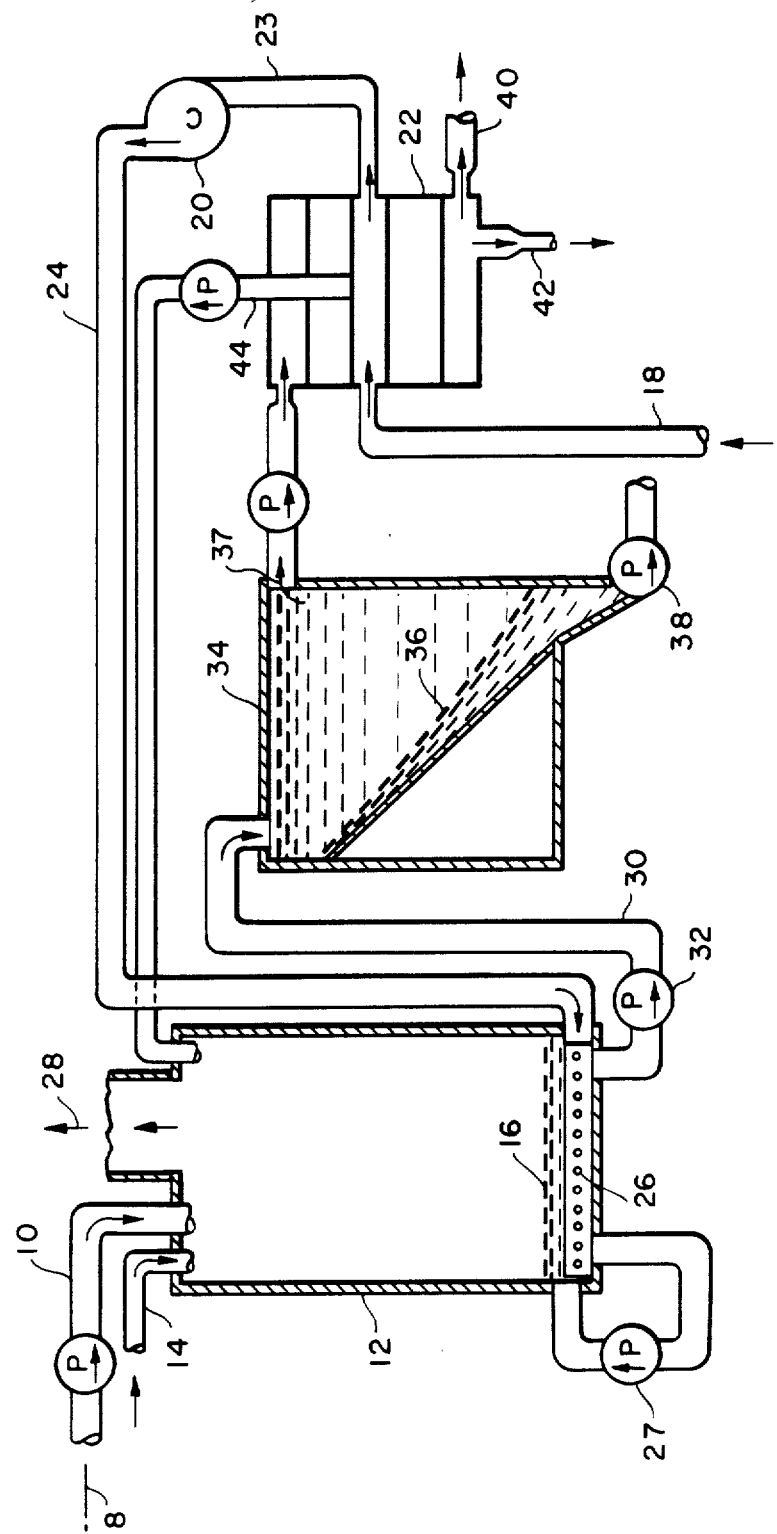
FIG. 1 is a schematic representation of one apparatus for practicing the invention.

Referring to FIG. 1, a slurry, exiting at 8 from a dust and water mixing tank (not shown), composed of alkaline solids and water, is pumped via pipe 10 into the treatment tank 12, along with additional water through inlet 14 from a suitable source (not shown) to produce a dilute slurry 16. Exhaust gas from a cement kiln or boiler (not shown) enters heat exchanger 22 through inlet 18 from which it emerges as cooled exhaust. Condensed exhaust gas moisture is collected in the heat exchanger 22 and conveyed to the treatment tank 12 through pipe 44. The exhaust then travels to compressor 20 through pipe 23 and is delivered via pipe 24 to distribution pipes 26 in the bottom of the treatment tank 12. To prevent settling of the solids to the bottom of treatment tank 12 the slurry may be stirred or recirculated by suitable means, for example by recirculation pump 27.

The exhaust gas bubbles through slurry 16 of alkaline solids and water to emerge from the tank top as scrubbed exhaust 28. Slurry 16, as a mixture of treated solid, water, and dissolved materials, is pumped by pump 32 via pipe 30 to the settling tank 34 where the settled solids 36 are pumped out by pump 38 and the water 37 laden with dissolved salts is pumped to heat exchanger 22 to provide cooling for the input exhaust gas. The water from salt solution 37 is evaporated to a vapor and released via pipe 40 to the atmosphere. The salts from the salt solution 37 are concentrated and/or precipitated and collected from the heat exchanger via pipe 42. The cationic components of the collected salts are principally calcium, potassium, magnesium, and sodium. The anionic components of the salts are principally sulfate, carbonate and nitrate. The actual composition of the salts will depend on the initial composition of the kiln dust to be treated and on the composition of the exhaust gas.

The heat exchanger 22 is a dual purpose heat exchanger-crystallization unit of a known type which will extract heat from the exhaust gas and use that heat, including latent heat derived from condensation of the exhaust gas moisture to evaporate water.

THE APPARATUS

The whole system is created from well known parts combined by standard methods. For example, typically the treatment tank may have a volume of one million gallons and be provided with gas distribution and stirring means; the settling tank may have a volume of 100 thousand gallons, both being constructed from stainless steel, or other suitable materials, such as rubber, which can tolerate highly alkaline or acidic solutions.

WORKING PRINCIPLE

The basic working principle in this invention is recombination and reaction of two waste streams produced during burning to provide mutual neutralization of the waste streams, production of a valuable and useful by-product, and utilization of low grade heat energy. The two waste streams are the gaseous oxides which produce acidic solutions in water and the waste particulate matter from cement kilns, which produce basic solutions in water.

After partial dissolution in water, the two wastes react to neutralize each other. In the case of cement kiln dust, which contains excess potassium and/or sodium and sulfate, the process provides for dissolution of a significant proportion of the remaining undissolved solids which include calcium and magnesium salts. The resulting solids are therefore suitable for use as process feed stock. The potassium sulfate and other salts removed from the heat exchanger-crystallization unit are suitable as fertilizer or as a source of material for extraction of chemicals. At the same time, the exhaust gas passing through the slurry in the treatment tank is cleansed of a significant portion of the oxides of sulfur and nitrogen, by forming sulfates and nitrates.

EXAMPLE

The discussion that follows is an example of use of the process in a moderate size wet process cement producing facility.

Exhaust gas from the kiln baghouse, fed through duct 18, is introduced to heat exchanger 22 at a rate of 200,000 actual cubic feet per minute by compressor 20. The exhaust gas is variable in composition, but contains roughly 29% water, 25% carbon dioxide, 36% nitrogen, 10% oxygen and 400 to 600 ppm nitrogen oxides and 200 ppm sulfur dioxide. In heat exchanger 22 the exhaust gas is cooled and water is condensed, resulting in a 35% to 40% decrease in flow volume. The exhaust gas is then drawn by compressor 20 through pipe 23 for delivery through pipe 24 to distribution pipes 26 and allowed to react with slurry 16 where most of the oxides of sulfur and nitrogen are removed. In lab scale trials 99% of the $SO_2$ was removed from the exhaust stream.

Kiln dust is introduced to treatment tank 12 at a rate of eight to twelve tons per hour dry weight. Water is added to produce a dilute slurry of up to 95% water content. The slurry water content is determined by the initial concentration of potassium and sodium in the waste dust and on the desired concentration in the material to be returned to the kiln feed system. After reaction with the exhaust gas, the slurry of treated dust is pumped at a rate of approximately 200 gallons per minute to settling tank 34. In this tank the solids settle to form a slurry of approximately 35% water and 65% solids, beneath a solution of water and soluble salts dissolved during treatment. The slurry is pumped by pump 38 from tank 34 and combined with process feed for a cement plant at a rate of approximately 7.8 tons per hour of solids. The water solution is pumped through outlet 37 to heat exchanger 22 at approximately 200 gallons per minute to provide cooling for the exhaust gas and to evaporate the water therefrom to produce the by-product salts. The by-product salts, removed via pipe 42, are produced at a rate of approximately eight to twelve tons per day. The by-product salts include potassium sulfate, calcium carbonate, and other salts with cationic components incuding potassium, calcium, magnesium, and sodium and anionic components including carbonate, sulfate, and nitrate. A portion of the nitrate oxidizes the sulfite to sulfate.

Figure 2:
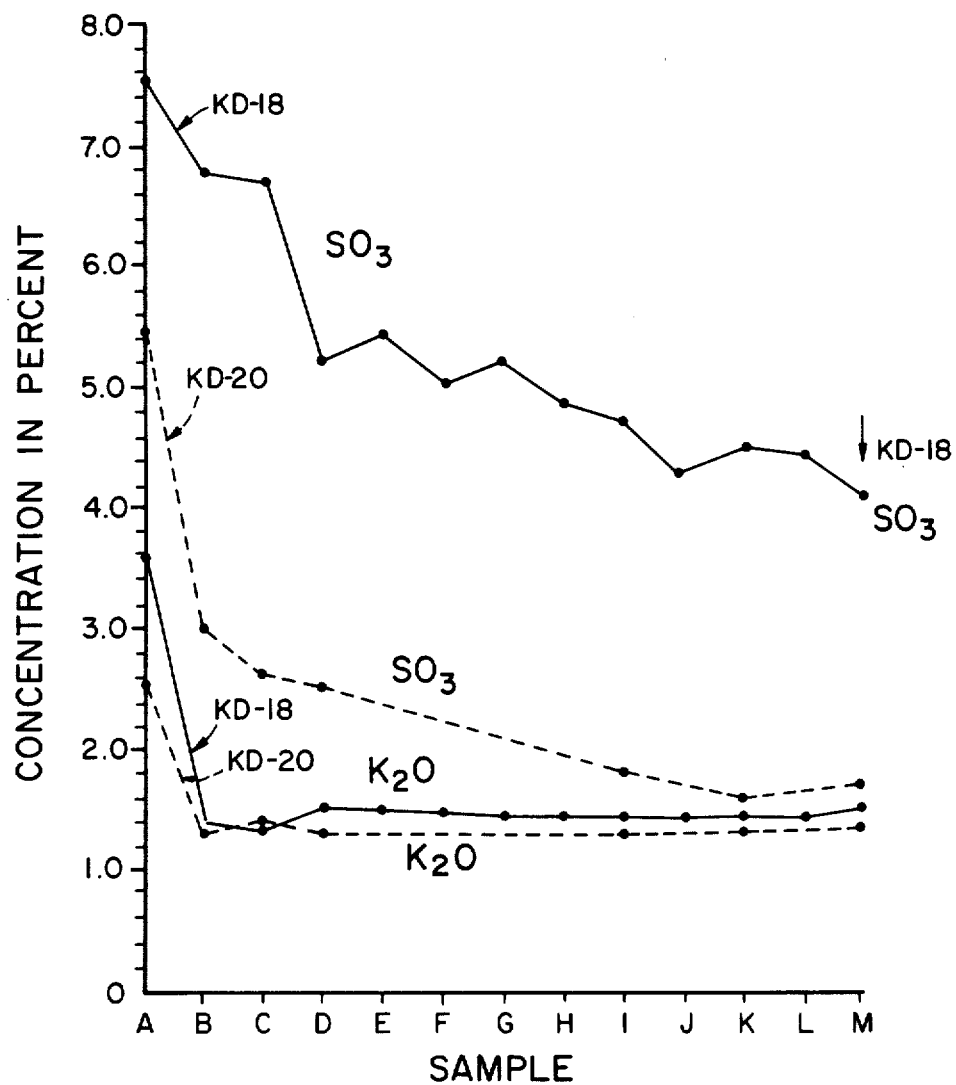
FIG. 2 is a graph illustrating the effectiveness of removal of potassium and sulfur oxides from kiln dust during reaction with exhaust gas oxides according to the invention.

Referring to FIG. 2, the results of two experiments (KD-18 and KD-20) are displayed, showing that extraction of the alkali metal salts from the dust results in the treated dust being acceptable as kiln feed stock. That is, the level of potassium salts falls from approximately 3% to less than 1½%, and the level of sulfate falls from approximately 6% to 3% or below. It should be noted that in the examples illustrated in FIG. 2 a full charge of dust was loaded initially into the treatment tank and then the introduction of gas commenced. This accounts for the slopes of the graph during days A through M. This reduction in potassium, sodium, and sulfate concentration in the dust, from initial untreated to final treated material is greater than 50%. Samples A-M refer to successive days during which samples were taken from a continuous treatment process.

The impact of addition of treated dust on raw feed composition is shown in the following table showing the percentage of each oxide in normal kiln feed for both Type I and Type II cement production. The figures contained in the columns labeled "100 TPD Dust Added to Feed" and "200 TPD Dust Added to Feed" show dramatically the slight impact on composition of the feed resulting from the addition of 100 tons per day and 200 tons per day respectively, of treated dust to the normal feed.

TABLE

Impact of Treated Dust on Kiln Feed Composition

|  | Normal Feed | 100 TPD Dust Added to Feed | 200 TPD Dust Added to Feed |
|---|---|---|---|
| Type I | | | |
| $SiO_2$ | 12.99 | 12.99 | 12.99 |
| $Al_2O_3$ | 3.57 | 3.59 | 3.61 |
| $Fe_2O_3$ | 1.45 | 1.53 | 1.61 |
| CaO | 43.49 | 43.62 | 43.75 |
| MgO | 2.83 | 2.81 | 2.78 |
| $SO_3$* | 0.18 | 0.23 | 0.28 |
| $K_2O$ | 0.93 | 0.94 | 0.96 |
| Loss | 35.83 | 35.45 | 35.07 |
| Si Ratio | 2.58 | 2.54 | 2.49 |
| Al/Fe | 2.46 | 2.35 | 3.24 |
| Type II | | | |
| $SiO_2$ | 13.24 | 13.23 | 13.22 |
| $Al_2O_3$ | 3.33 | 3.35 | 3.38 |
| $Fe_2O_3$ | 1.77 | 2.03 | 2.09 |
| CaO | 43.09 | 43.23 | 43.38 |
| MgO | 2.66 | 2.64 | 2.62 |
| $SO_3$* | 0.19 | 0.24 | 0.29 |
| $K_2O$ | 0.68 | 0.70 | 0.72 |
| Loss | 35.20 | 34.85 | 34.49 |
| Si Ratio | 2.49 | 2.46 | 2.42 |
| Al/Fe | 1.69 | 1.65 | 1.62 |

*Sulfate expressed as $SO_3$

These results demonstrate that the major change in kiln dust composition is the removal of $SO_3$ and $K_2O$ and that the unremoved $K_2O$ and $SO_3$ do not significantly alter the composition of the raw feed.

While there has herein been disclosed and described a presently preferred method and apparatus for practicing the invention, it will nevertheless be understood that the same is by way of illustration and not by way of limitation, and it is intended that the scope of the invention be limited only by the proper interpretation to be afforded the appended claims.

I claim:

1. A method of simultaneously scrubbing acidic oxides of sulfur, nitrogen and carbon from the hot exhaust stream from a cement kiln and utilizing acids derived therefrom to produce useful products from the carbonates and oxides of alkali and alkaline earth metals contained as solids in cement kiln dust comprising said carbonates and oxides and insoluble silicates, aluminates and iron compounds, which comprises (a) mixing said dust with water to form a slurry comprising undissolved solids and a solution of the soluble compounds in said dust, and
   (b) passing said gas stream into said slurry whereby said acidic oxides contained therein will react with water to produce acids,
   the latter will react with said carbonates and oxides of alkali and alkaline earth metals to yield a solution of alkali and alkaline earth metal salts comprising principally the cationic components, calcium, potassium, magnesium and sodium, and anionic components, carbonate, sulfate and nitrate, and a precipitate of alkali and alkaline earth metal salts with insoluble silicates, aluminates and iron compounds, and the gas of said gas stream after passing through said slurry emerges as scrubbed exhaust.

2. The method of claim 1 wherein said gas stream is dehumidified by cooling prior to said passing step.

3. The method of claim 2 wherein said alkali salt solution is used to cool and dehumidify said gas stream.

4. The method of claim 1 wherein said precipitate together with insoluble silicates, aluminates and iron compounds is added to the feed stock of a cement plant to produce cement.

5. The method of claim 3 wherein heat from said exhaust gas stream is used to remove water from said alkali salt solution.

6. The method of claim 5 wherein said heat is derived in part from each of the hot exhaust gas, the latent heat of moisture in said exhaust, the hydration reaction between dust and water and from compressing said gas prior to said passing step.

7. The method of claim 1 wherein the dissolved solids contained in said alkali salt solution are suitable for use as a fertilizer.

8. The method of claim 1 wherein said solution of alkali and alkaline earth metal salts is separated from said precipitate and insoluble silicates, aluminates and iron compounds by allowing the latter to settle therefrom.

9. The method of claim 1 including the step of transferring said solution of alkali and alkaline earth metal salts and said precipitate with said insolubles to a settling tank wherein said salt solution is separated from said precipitate and insoluble silicates, aluminates and iron compounds by allowing the latter to settle therefrom.

10. The method of claim 9 including the step of passing the separated salt solution through a heat exchanger wherein it extracts heat from said exhaust gas before the latter is passed into said slurry.

11. The method of claim 1 including the step of agitating said salt solution and precipitate to prevent settling of the solids during said reactions.

* * * * *

UNITED STATES PATENT AND TRADEMARK OFFICE
CERTIFICATE OF CORRECTION

PATENT NO.  : 4,716,027
DATED       : December 29, 1987
INVENTOR(S) : Garrett L. Morrison It is certified that error appears in the above-identified patent and that said Letters Patent are hereby corrected as shown below:

Col. 7, line 8, delete "alkali"

Col. 7, line 17, delete "alkali"

Col. 8, line 2, delete "alkali"

Signed and Sealed this

Seventh Day of June, 1988

Attest:

Attesting Officer

DONALD J. QUIGG

Commissioner of Patents and Trademarks